(12) United States Patent
Igarashi (10) Patent No.: US 9,500,503 B2
(45) Date of Patent: Nov. 22, 2016

(54) DIFFERENTIAL PRESSURE TYPE FLOWMETER AND FLOW CONTROLLER PROVIDED WITH THE SAME

(71) Applicant: Surpass Industry Co., Ltd., Gyoda-shi, Saitama (JP)

(72) Inventor: Hiroki Igarashi, Gyoda (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 14/625,200

(22) Filed: Feb. 18, 2015

(65) Prior Publication Data
US 2015/0233746 A1    Aug. 20, 2015

(30) Foreign Application Priority Data
Feb. 20, 2014    (JP) .................................. 2014-030843

(51) Int. Cl.
*G05D 7/06* (2006.01)
*G01F 1/42* (2006.01)
(Continued)

(52) U.S. Cl.
CPC . *G01F 1/42* (2013.01); *G01F 1/46* (2013.01); *G01F 1/48* (2013.01); *G05D 7/0623* (2013.01); *Y10T 137/7722* (2015.04); *Y10T 137/7759* (2015.04); *Y10T 137/7761* (2015.04)

(58) Field of Classification Search
CPC .................... Y10T 137/7759; Y10T 137/776; Y10T 137/7761; Y10T 137/7722; G01F 1/42; G01F 1/46; G01F 1/48; G01F 1/363; G05D 7/0623
USPC ....... 73/861.52–861.64; 137/486, 487, 487.5
See application file for complete search history.

(56) References Cited

U.S. PATENT DOCUMENTS 2,127,501 A * 8/1938 Dall .......................... G01F 1/42
138/44

4,375,169 A * 3/1983 Torresin ................. A61B 5/087
73/861.53
(Continued)

FOREIGN PATENT DOCUMENTS

JP    2013-24573 A    2/2013
JP    5220642 B2      6/2013

OTHER PUBLICATIONS

Reader-Harris et al., "Best Practice Guide: Impulse Lines for Differential-Pressure Flowmeters," NEL No. 2005/224, retrieved at https://www.idc-online.com/technical_reference/pdfs/instrumentation/Differential%20pressure%20meters_nel.pdf, pp. 1-22 (Sep. 2005).
(Continued)

*Primary Examiner* — William McCalister
(74) *Attorney, Agent, or Firm* — Muncy, Geissler, Olds & Lowe, P.C.

(57) ABSTRACT

There is provided a differential pressure type flowmeter that includes an orifice provided in a main flow channel, a first pressure sensor configured to detect pressure of fluid on an upstream side of the orifice, a second pressure sensor configured to detect pressure of fluid on a downstream side of the orifice, a first pressure introduction flow channel configured to guide the fluid on the upstream side of the orifice to the first pressure sensor, and a second pressure introduction flow channel configured to guide the fluid on the downstream side of the orifice to the second pressure sensor, wherein a flow channel length and a flow channel diameter of the first pressure introduction flow channel coincide with those of the second pressure introduction flow channel, respectively, and a ratio of the flow channel length to the flow channel diameter is not less than 20 times and not more than 30 times.

8 Claims, 8 Drawing Sheets

(51) Int. Cl.
*G01F 1/46* (2006.01)
*G01F 1/48* (2006.01)

(56) References Cited

U.S. PATENT DOCUMENTS

| | | | | | |
|---|---|---|---|---|---|
| 4,611,105 | A | * | 9/1986 | Kobold | G01F 1/24 200/81.9 M |
| 4,957,007 | A | * | 9/1990 | Gray | G01L 19/0007 73/182 |
| 6,539,968 | B1 | * | 4/2003 | White | G05D 7/0635 137/10 |
| 7,422,028 | B2 | * | 9/2008 | Nugent | G01F 1/42 137/486 |
| 7,942,069 | B2 | * | 5/2011 | Peterson | G01F 1/36 73/716 |
| 8,225,814 | B2 | * | 7/2012 | Igarashi | F16K 37/0066 137/338 |
| 2012/0297893 | A1 | * | 11/2012 | Lawrence | G01F 1/40 73/861.52 |
| 2013/0005372 | A1 | | 1/2013 | Strei et al. | |

OTHER PUBLICATIONS

Extended European Search Report for European Application No. 15155784.0 dated Jul. 22, 2015.
Peattie et al., Fluid Dynamics for Bio Systems: Fundamentals and Model Analysis, Chapter 4 in *Transport Phenomena in Biomedical Engineering*, CRC Press, pp. 4-1-4-17 (Nov. 2012).
Reader-Harris et al., "Best Practice Guide: Impulse Lines for Differential-Pressure Flowmeters," NEL No. 2005/224, retrieved at https://www.idc-online.com/technical_references/pdfs/instrumentation/Diffferential%20pressure%20meters_nel.pdf, pp. 1-22 (Sep. 2005).

* cited by examiner

| PRESSURE INTRODUCTION FLOW CHANNEL LENGTH L [mm] | PRESSURE INTRODUCTION FLOW CHANNEL DIAMETER D3 [mm] | L/D3 [TIMES] | PRESSURE SENSOR MAXIMUM ARRIVAL TEMPERATURE [°C] | TEMPERATURE RISE WIDTH ΔT [°C] |
|---|---|---|---|---|
| 25.0 | 1.0 | 25 | 32 | 7 |
| 50.0 | 1.0 | 50 | 28 | 3 |
| 50.0 | 2.0 | 25 | 32 | 7 |
| 50.0 | 2.5 | 20 | 36 | 11 |
| 62.0 | 2.5 | 25 | 32 | 32 |
| 50.0 | 3.0 | 17 | 43 | 18 |
| 75.0 | 3.0 | 25 | 32 | 7 |

DIFFERENTIAL PRESSURE TYPE FLOWMETER AND FLOW CONTROLLER PROVIDED WITH THE SAME

CROSS-REFERENCE TO RELATED APPLICATIONS

This application is based on Japanese Patent Application No. 2014-030843, the contents of which are incorporated herein by reference in its entirety.

TECHNICAL FIELD

The present disclosure relates to a differential pressure type flowmeter, and a flow controller provided with the same.

BACKGROUND ART

Heretofore, flowmeters have been known that are provided in a pipe for allowing the flowing of fluid such as pure water and liquid chemicals used in a semiconductor manufacturing apparatus or the like, and measure the flow rate of the fluid that flows through the pipe. As the flowmeters, various types are known. For example, differential pressure type flowmeters are known. The differential pressure type flowmeter is an apparatus that detects the pressure of fluid on the upstream side of an orifice provided on a flow channel and the pressure of fluid on the downstream side of the orifice, with a pair of pressure sensors, and measures the flow rate of the fluid by a finite difference (differential pressure) between the detected pressures (e.g., see the publication of Japanese Patent No. 5220642).

SUMMARY

In a differential pressure type flowmeter disclosed in the publication of Japanese Patent No. 5220642, a temperature balancer is provided below a pair of pressure sensors to reduce a temperature difference, in order to avoid malfunction resulting from a temperature difference between the environmental temperatures of the pair of pressure sensors. According to the differential pressure type flowmeter disclosed in the publication of Japanese Patent No. 5220642, it is possible to avoid the malfunction resulting from the temperature difference between the pair of pressure sensors.

However, even when the temperature difference between the pair of pressure sensors is reduced, in a case where the temperature of fluid which flows into the differential pressure type flowmeter rapidly changes, there is a possibility that measurement errors are generated in detection values detected by the pair of pressure sensors, due to the temperature change. For example, there is a possibility that the temperatures of the pressure sensors rapidly change and measurement errors are generated in the detection values, or a possibility that the flow channels around the pressure sensors are deformed by the temperature difference and measurement errors are generated in the detection value of the pressure sensors. When the measurement errors are generated in the detection values of the pressure sensors due to the temperature change, it is impossible to accurately detect pressure. Consequently, it is impossible to accurately measure a flow rate.

The disclosure has been made in view of the aforementioned circumstances, and an object of the disclosure is to provide a differential pressure type flowmeter that suppresses the generation of measurement errors in detection values of pressure sensors due to temperature change even in a case where the temperature of fluid which flows into the differential pressure type flowmeter rapidly changes, and a flow controller provided with the same.

In order to solve the above problem, the present disclosure employs the following solutions.

A differential pressure type flowmeter according to the present disclosure includes a main flow channel configured to allow fluid to flow; an orifice provided in the main flow channel; an upstream pressure sensor configured to detect pressure of fluid on an upstream side of the orifice; a downstream pressure sensor configured to detect pressure of fluid on a downstream side of the orifice; a first flow channel communicating with the main flow channel, and configured to guide the fluid on the upstream side of the orifice to the upstream pressure sensor; and a second flow channel communicating with the main flow channel, and configured to guide the fluid on the downstream side of the orifice to the downstream pressure sensor, wherein a flow channel length and a flow channel diameter of the first flow channel coincide with a flow channel length and a flow channel diameter of the second flow channel, respectively, and a ratio of the flow channel length to the flow channel diameter is not less than 20 times and not more than 30 times.

According to the differential pressure type flowmeter of the present disclosure, the flow channel length and the flow channel diameter of the first flow channel that guides the fluid on the upstream side of the orifice to the upstream pressure sensor coincide with the flow channel length and the flow channel diameter of the second flow channel that guides the fluid on the downstream side of the orifice to the downstream pressure sensor, respectively. The ratio of the flow channel length to the flow channel diameter is not less than 20 times, and therefore the flow channel length with respect to the flowing amount of the fluid in each flow channel is sufficiently secured. Therefore, for example, even in a case where the temperature of the fluid that flows into the differential pressure type flowmeter rapidly changes from a temperature which coincides with an environmental temperature (e.g., changed from an environmental temperature of 25° C. to 80° C.), the temperature of the fluid can be made to be a temperature (e.g., 35° C. or less) sufficiently close to the environmental temperature before the fluid reaches each pressure sensor from the main flow channel. Accordingly, it is possible to suppress the generation of a measurement error in the detection value of each pressure sensor due to temperature change, even in a case where the temperature of the fluid that flows into the differential pressure type flowmeter rapidly changes.

Additionally, the ratio of the flow channel length to the flow channel diameter is 30 times or less, and therefore it is possible to suppress a defect that the flow channel length with respect to the flow amount of the fluid in each flow channel becomes too long, or the flow channel diameter with respect to the flow channel length becomes too small, and excessive time is required for changing over the kind of the fluid flowing in the differential pressure type flowmeter (e.g., changing over from pure water to liquid chemicals), and to secure the replaceability of the fluid.

Thus, according to the differential pressure type flowmeter of the present disclosure, it is possible to suppress the generation of measurement error in the detection value of each pressure sensor due to temperature change, even in a case where the temperature of the fluid that flows into the differential pressure type flowmeter rapidly changes. Additionally, it is possible to secure the replaceability of the fluid.

In the differential pressure type flowmeter of the present disclosure, the ratio of the flow channel length to the flow channel diameter is preferably 25 times. Additionally, it is more preferable that the flow channel length is 50 mm, and the flow channel diameter is 2 mm.

Thus, it is possible that the temperature of each pressure sensor can be made to be a temperature (e.g., 35° C. or less) which does not cause the generation of a measurement error in the detection value of each pressure sensor, for example, even in a case where the temperature of the fluid rapidly changes from an environmental temperature in environment, in which the differential pressure type flowmeter is installed, to a predetermined temperature (e.g., case where the temperature is changed from 25° C. to 80° C.).

In the differential pressure type flowmeter of the present disclosure, the main flow channel, the first flow channel, and the second flow channel are preferably formed inside a body part formed by a resin material.

Thus, it is possible to provide the differential pressure type flowmeter that includes the body part integrally formed by the main flow channel, the first flow channel, the second flow channel, and the resin material.

In the differential pressure type flowmeter of the present disclosure, a cooling structure in which a contact area with outside air is increased is preferably formed on an outer peripheral surface of the body part that forms the first flow channel and the second flow channel.

Thus, the fluid flowing in each of the first flow channel and the second flow channel can be sufficiently cooled by the cooling structure before reaching each pressure sensor, when the fluid is guided from the main flow channel to each pressure sensor through each of the first flow channel and the second flow channel communicating with the main flow channel.

In the above configuration, the cooling structure is more preferably a fin structure in which annular recessed parts and annular protruding parts are alternately arranged along a flow channel direction of the first flow channel and the second flow channel.

Thus, the fluid flowing in each of the first flow channel and the second flow channel can be sufficiently cooled by a cooling effect by the fin structure, before reaching each pressure sensor.

The differential pressure type flowmeter of the present disclosure may include: a first outlet configured to discharge the fluid guided to the upstream pressure sensor through the first flow channel, to outside; and a second outlet configured to discharge the fluid guided to the downstream pressure sensor through the second flow channel, to the outside.

Thus, it is possible to easily replace fluid without returning the fluid guided to the upstream pressure sensor through the first flow channel, to the main flow channel through the first flow channel again. Similarly, it is possible to easily replace fluid without returning the fluid guided to the downstream pressure sensor through the second flow channel, to the main flow channel through the second flow channel again.

A flow controller according to the present disclosure includes: any of the differential pressure type flowmeters described above; and a control unit configured to control a flow rate of fluid that flows out of a flow outlet, by using a measured value of the differential pressure type flowmeter.

Thus, it is possible to provide a flow controller that suppresses the generation of measurement errors in the detection values of the pressure sensors due to temperature change, in a case where the temperature of fluid which flows into the differential pressure type flowmeter rapidly changes. Additionally, it is possible to secure the replaceability of the fluid, and to avoid the enlargement of the flow controller.

According to the present disclosure, it is possible to provide a differential pressure type flowmeter that suppresses the generation of measurement errors in the detection values of pressure sensors due to temperature change even in a case where the temperature of fluid which flows into the flowmeter rapidly changes, and a flow controller provided with the same.

DESCRIPTION OF EMBODIMENTS

First Embodiment

Hereinafter, a flow controller 10 of a first embodiment of the present disclosure will be described with reference to the drawings.

The flow controller 10 of this embodiment is an apparatus that measures the flow rate of fluid (such as pure water and liquid chemicals) which flows from a pipe (not shown) on the upstream side through a flow channel inlet 11, and regulates the flow rate of the fluid which flow out of a flow channel outlet 12 according to the measured flow rate.

Figure 1:
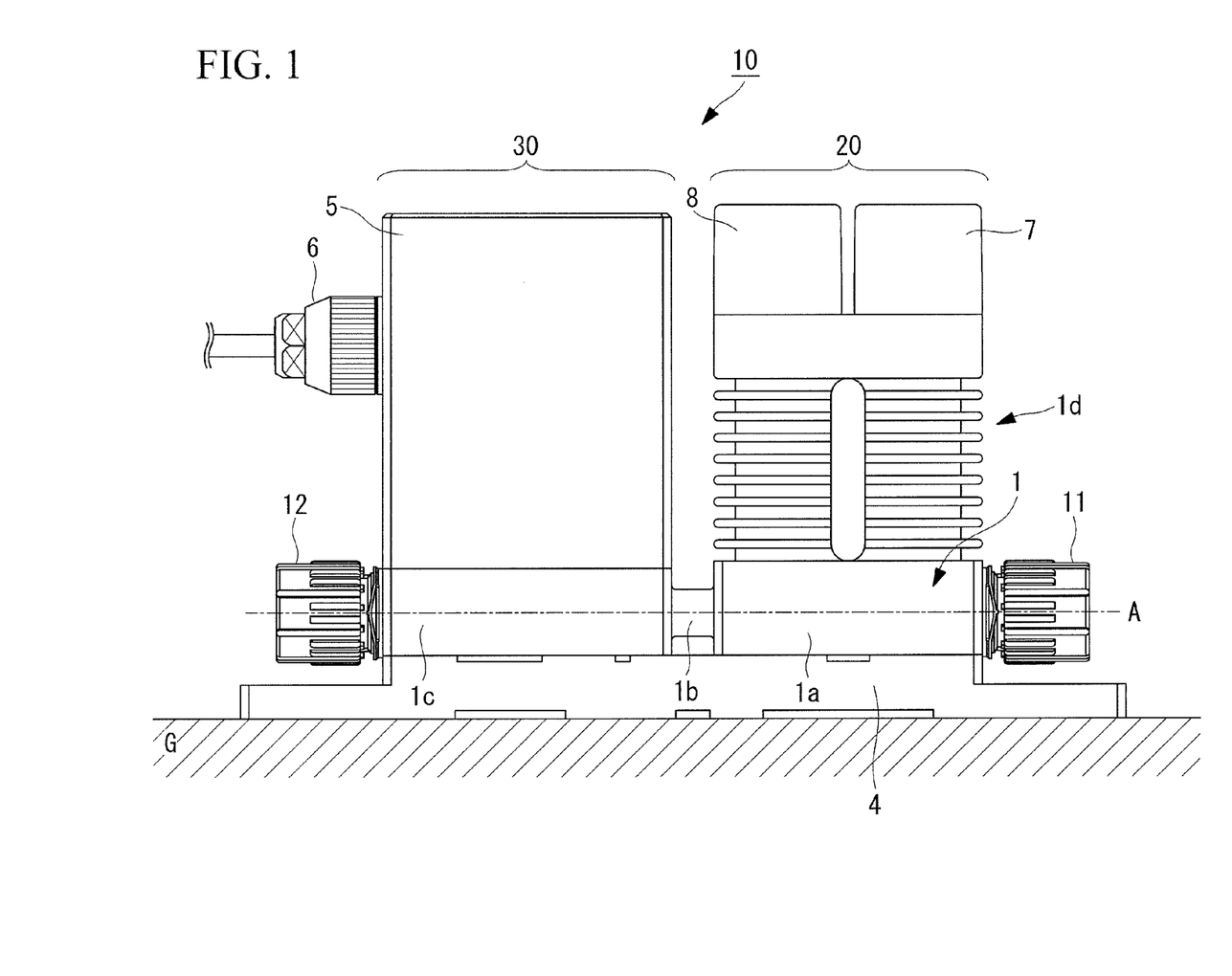
FIG. 1 is a front view of a flow controller according to a first embodiment of the present disclosure.
Figure 2:
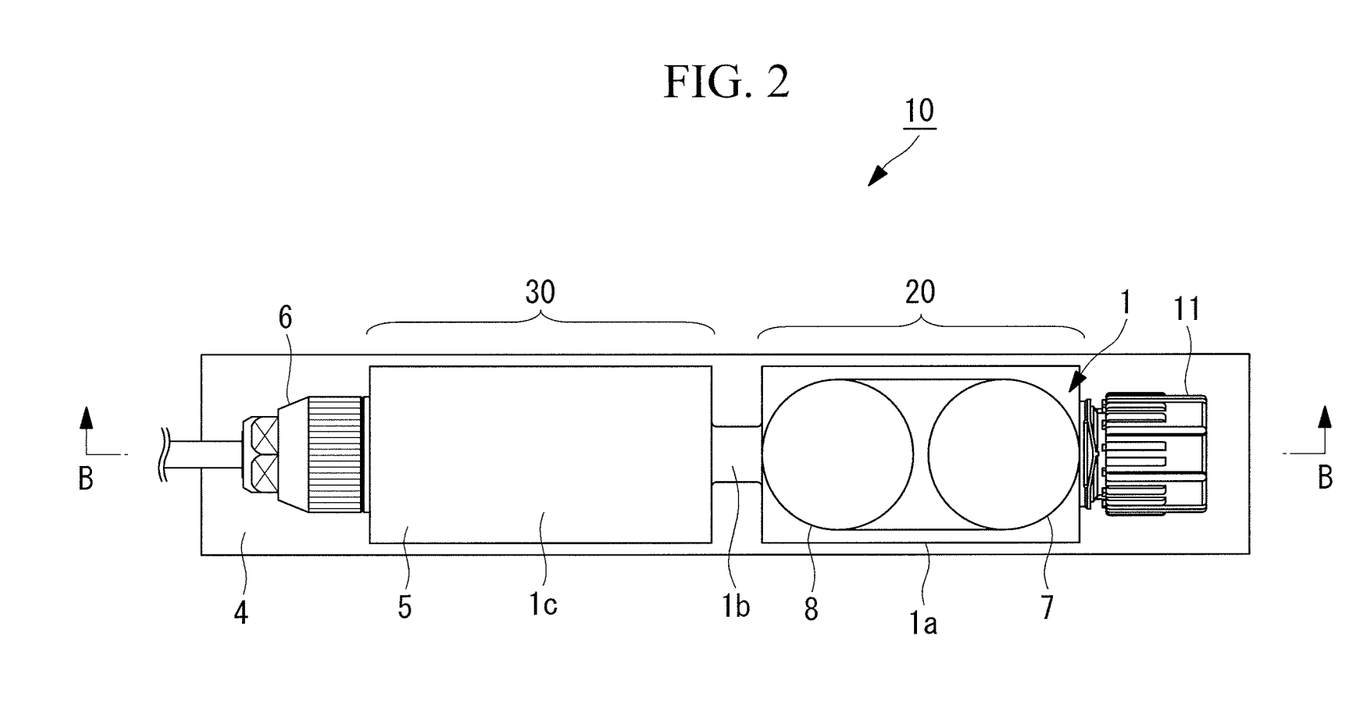
FIG. 2 is a plan view of the flow controller shown in FIG. 1.
Figure 3:
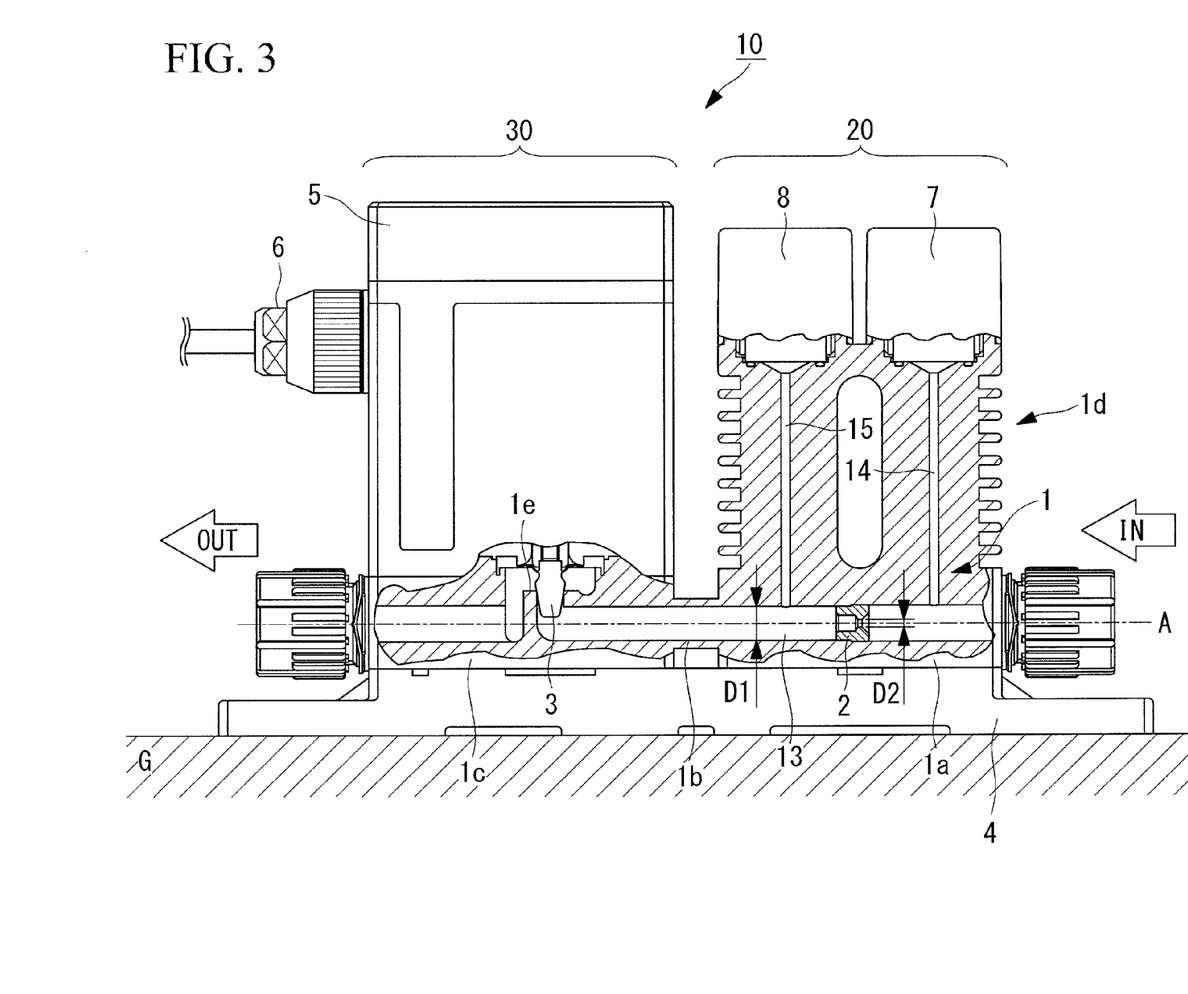
FIG. 3 is a partial sectional view taken along the B-B arrow in FIG. 2.

As shown in FIG. 1 to FIG. 3, the flow controller 10 includes a differential pressure type flowmeter 20 that is provided on a side close to the flow channel inlet 11, and a flow regulating valve 30 that is provided on a side close to the flow channel outlet 12.

The flow controller 10 includes a base 4 that is mounted on an installation surface G, and a body 1 (body part) that is mounted on the base, and formed therein with a main flow channel 13 for allowing fluid to flow between the flow channel inlet 11 and the flow channel outlet 12. The base 4 is integrally formed by using, for example, polypropylene (PP).

As shown in FIG. 3, the body 1 is a single member configured by integrally forming an upstream body 1a, a connecting part 1b, a downstream body 1c, a cooling part 1d, and a valve seat 1e. The body 1 is formed by a fluoroplastic material such as polytetrafluoroethylene (PTFE).

The differential pressure type flowmeter 20 is an apparatus that measures the flow rate of fluid which flows from the flow channel inlet 11. The differential pressure type flowmeter 20 includes the upstream body 1a, the cooling part 1d, an orifice 2, a first pressure sensor 7 (upstream pressure sensor), a second pressure sensor 8 (downstream pressure sensor). The upstream body 1*a* is a member formed with apart of the main flow channel 13 therein, and the main flow channel 13 allows the fluid to flow between the flow channel inlet 11 and the flow channel outlet 12.

As shown in FIG. 3, the main flow channel 13 formed inside the upstream body 1*a* is provided with the orifice 2. The orifice 2 is a member that forms a flow channel diameter D2 smaller than a flow channel diameter D1 of the main flow channel 13. When the fluid passes the orifice 2, the flow velocity of the fluid increases, and the static pressure of fluid at the downstream of the orifice is lowered with this increase. A finite difference (differential pressure) between the static pressure of the fluid on the upstream side of the orifice 2 and the static pressure of fluid on the downstream side of the orifice 2 is a value according to the flow rate of the fluid which passes the main flow channel 13. Accordingly, the differential pressure type flowmeter 20 can measure the flow rate of the fluid which is flowing in the main flow channel 13 by measuring the differential pressure between the static pressure of the fluid on the upstream side of the orifice 2 and the static pressure of the fluid on the downstream side of the orifice 2.

The differential pressure type flowmeter 20 includes the first pressure sensor 7 that measures the static pressure on the upstream side of the orifice 2, and the second pressure sensor 8 that measures the static pressure on the downstream side of the orifice 2.

Figure 4:
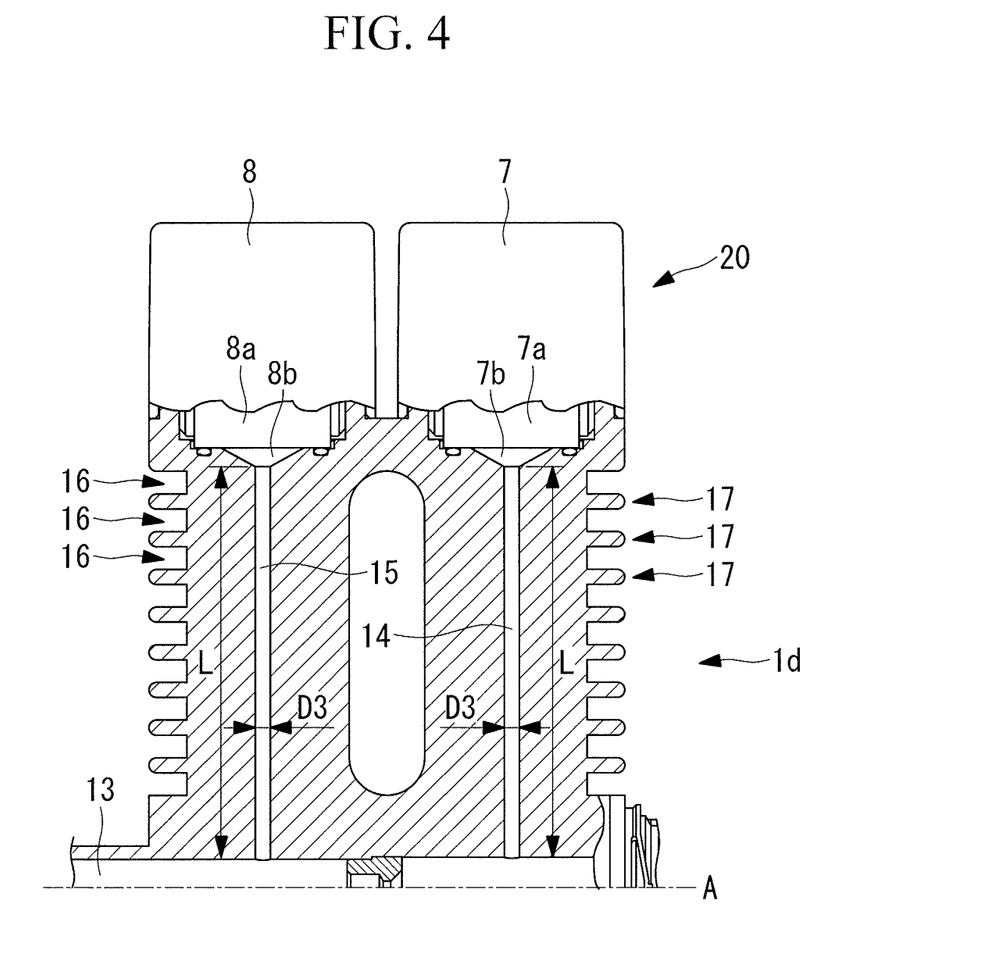
FIG. 4 is an enlarged partial view of the differential pressure type flowmeter shown in FIG. 3.

As shown in FIG. 4, the first pressure sensor 7 includes a sensor body 7*a* that detects the pressure of fluid which flows from the main flow channel 13 into a first fluid chamber 7*b* through a first pressure introduction flow channel 14 (first flow channel) formed inside the cooling part 1*d* which configures a part of the body 1. The second pressure sensor 8 includes a sensor body 8*a* that detects the pressure of fluid which flows from the main flow channel 13 into a second fluid chamber 8*b* through a second pressure introduction flow channel 15 (second flow channel) formed inside the cooling part 1*d*.

As shown in FIG. 4, the first fluid chamber 7*b* includes an inclined plane in which a diameter gradually increases with distance from an outlet of the first pressure introduction flow channel 14. In the lower part of the first fluid chamber 7*b*, a substantially conical inner surface shape is configured by this inclined plane. Similarly, the second fluid chamber 8*b* includes an inclined plane in which a diameter gradually increases with distance from an outlet of the second pressure introduction flow channel 15. In the lower part of the second fluid chamber 8*b*, a substantially conical inner surface shape is configured by this inclined plane. With the shapes thus formed, remnants such as particles are unlikely to be retained in the outer peripheral edge of the first fluid chamber 7*b* and the outer peripheral edge of the second fluid chamber 8*b*.

A first pressure value measured by the sensor body 7*a* of the first pressure sensor 7, and a second pressure value measured by the sensor body 8*a* of the second pressure sensor 8 are converted into respective electric signals to input the electric signals to a control board (not shown) provided in the flow regulating valve 30. The control board (control unit) that receives the input of the first pressure value and the second pressure value converts differential pressure between the first pressure value and the second pressure value to a flow rate, to measure the flow rate of fluid which flows in the main flow channel 13.

As the first pressure sensor 7 and the second pressure sensor 8, various sensors for measuring the pressure of fluid can be employed. For example, strain gage type pressure sensors, piezo type pressure sensors, capacitance type pressure sensors can be employed.

The first pressure introduction flow channel 14 is a flow channel that extends on a straight line orthogonal to an axis A of the main flow channel 13. The second pressure introduction flow channel 15 is a flow channel that extends on a straight line orthogonal to the axis A of the main flow channel 13. A position where the first pressure introduction flow channel 14 communicates with the main flow channel 13, and a position where the second pressure introduction flow channel 15 communicates with the main flow channel 13 are an equal distance along the axis A from a position where the flow channel diameter becomes D2 by the orifice 2.

Thus, the first pressure introduction flow channel 14 is a flow channel that communicates with the main flow channel 13, and introduces the fluid on the upstream side of the orifice 2 to the first pressure sensor 7. Additionally, the second pressure introduction flow channel 15 is a flow channel that communicates with the main flow channel 13, and introduces the fluid on the upstream side of the orifice 2 to the second pressure sensor 8.

Now, the flow regulating valve 30 shown in FIG. 3 will be described.

The flow regulating valve 30 is an apparatus that regulates the flow rate of fluid which flows from the flow channel outlet 12 according to the flow rate measured by the differential pressure type flowmeter 20.

The flow regulating valve 30 includes the downstream body 1*c*, a needle 3, the valve seat 1*e*, a drive mechanism (not shown) that includes a motor, the control board (not shown) that controls the drive mechanism, and a cover 5 that protects the drive mechanism and the control board from the outside. To the control board and the drive mechanism, power is supplied from the outside through a cable connected through a connector 6. Additionally, the control board receives various instructions such as an instruction of a set value of a flow rate from the outside, through a control signal line provided in the cable.

The flow regulating valve 30 causes the drive mechanism to move the needle 3 (valve body) in a direction orthogonal to the axis A of the main flow channel 13, and regulates a distance between the needle 3 and the valve seat 1*e*. The flow regulating valve 30 can regulate the flow rate of fluid that passes between the needle 3 and the valve seat 1*e* by regulating the distance between the needle 3 and the valve seat 1*e*. For example, the flow regulating valve 30 regulates the flow rate of the fluid such that the flow rate measured by the differential pressure type flowmeter 20 coincides with the set value of the flow rate instructed through the cable from the outside.

Thus, the control board (control unit) provided in the flow regulating valve 30 controls the flow rate of fluid that flows out of the flow channel outlet, by using the flow rate (measured value) of fluid measured by the differential pressure type flowmeter 20.

Now, a structure of the vicinity of the cooling part 1*d* of the differential pressure type flowmeter 20 of this embodiment will be described.

As shown in FIG. 4, the flow channel length L and the flow channel diameter D3 of the first pressure introduction flow channel 14 coincide with the flow channel length L and the flow channel diameter D3 of the second pressure introduction flow channel 15, respectively. Herein, the flow channel length L of the first pressure introduction flow channel 14 means a length from the outer peripheral surface of the main flow channel 13 to an inlet of the first fluid chamber 7b, as shown in FIG. 4. Additionally, the flow channel length L of the second pressure introduction flow channel 15 means a length from the outer peripheral surface of the main flow channel 13 to an inlet of the second fluid chamber 8b, as shown in FIG. 4.

As described above, in a case where the temperature of fluid that flows into the differential pressure type flowmeter 20 rapidly changes, there is a possibility that measurement errors are generated in the detection values detected by a pair of the pressure sensors (the first pressure sensor 7 and the second pressure sensor 8), due to the temperature change. Therefore, the cooling part 1d needs to have a structure in which even in a case where the temperature of the fluid in the main flow channel 13 rapidly changes, the fluid can be sufficiently cooled such that the temperature of fluid that reaches each of the first fluid chamber 7b and the second fluid chamber 8b does not rapidly changes.

Figure 5:
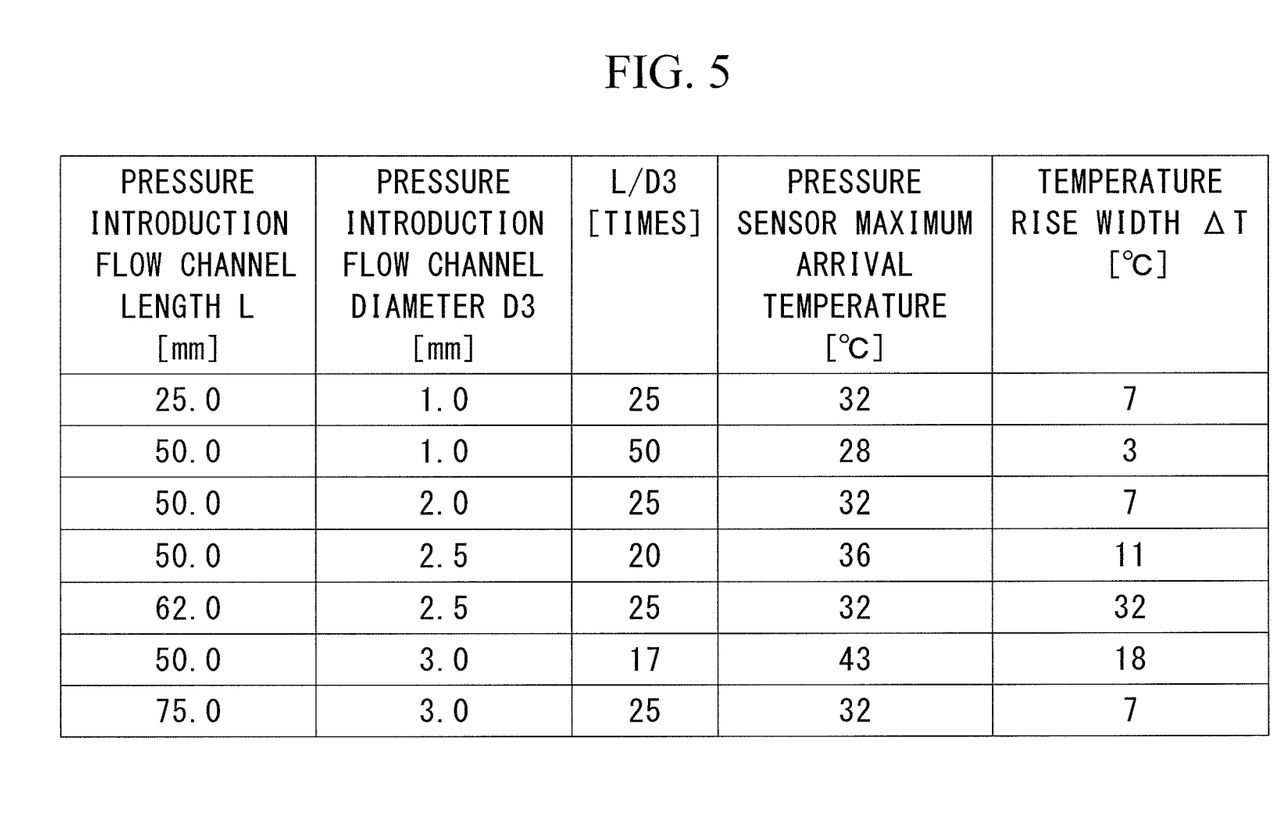
FIG. 5 is a diagram showing experimental data showing values of a pressure sensor maximum arrival temperature with respect to a pressure introduction flow channel diameter and a pressure introduction flow channel length.

The inventors conducted an experiment by changing the above flow channel lengths L and flow channel diameters D3, and obtained experimental data shown in FIG. 5. This experimental data is experimental data obtained in a case of changing over from a state where pure water at 25° C. is flowing in the main flow channel 13, to a state where pure water at 80° C. is flowing in the main flow channel 13. In FIG. 5, the pressure sensor maximum arrival temperature (° C.) indicates a temperature when the pure water at 80° C. is flowing in the main flow channel 13, and thereafter the temperatures of the sensor bodies (the sensor body 7a and the sensor body 8a) of the pressure sensors are measured, and the highest temperature is measured. In FIG. 5, the temperature rise width ΔT (° C.) indicates a temperature of a finite difference between 25° C. and the pressure sensor maximum arrival temperature (° C.).

When a graph showing relation between a ratio of the flow channel length L to the flow channel diameter D3 (hereinafter, referred to as L/D3), and the pressure sensor maximum arrival temperature was created on the basis of a plurality of pieces of experimental data including the experimental data shown in FIG. 5, a graph shown in FIG. 6 was obtained.

Figure 6:
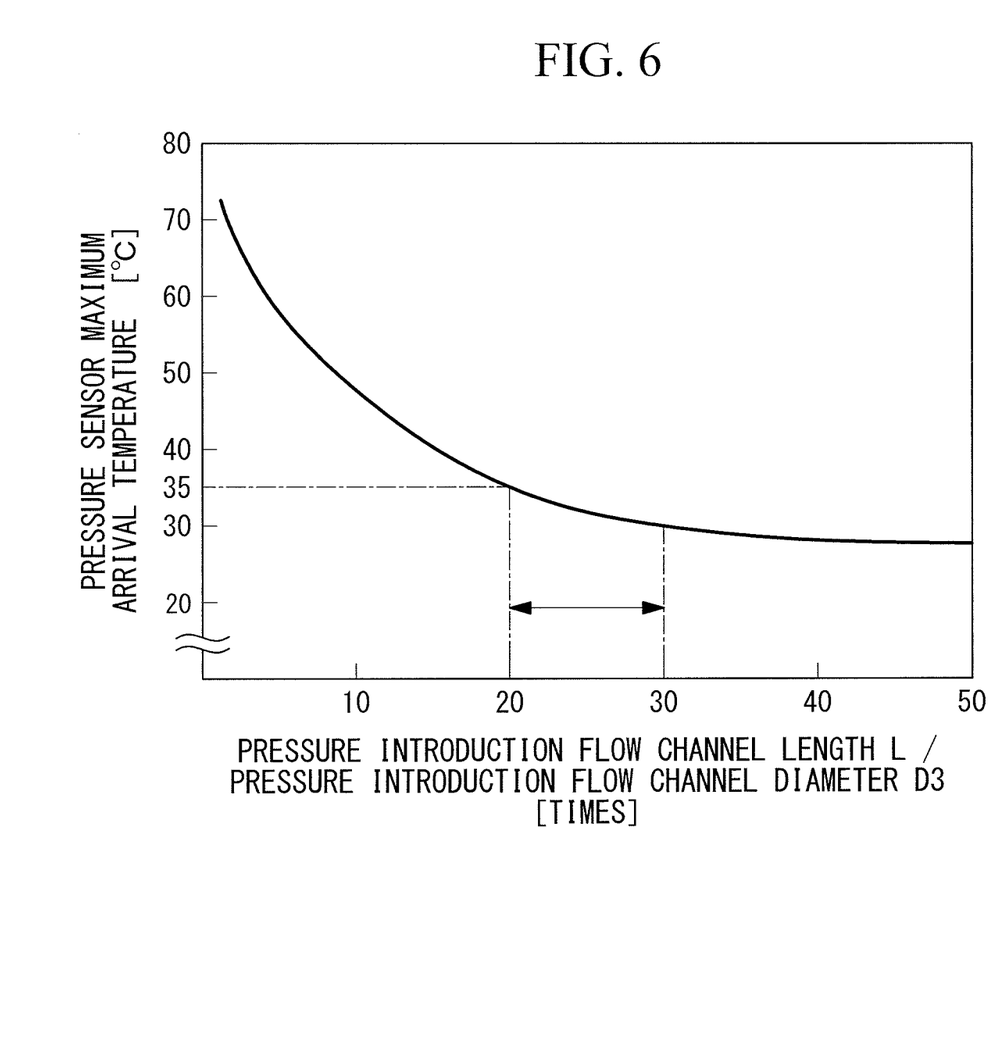
FIG. 6 is a graph showing relation between a ratio of the pressure introduction flow channel length to the pressure introduction flow channel diameter, and the pressure sensor maximum arrival temperature.

As shown in FIG. 6, the smaller the value of L/D3 is, the higher the pressure sensor maximum arrival temperature is. The greater the value of L/D3 is, the lower the pressure sensor maximum arrival temperature is. This means that when the value of L/D3 is greater, the flow channel length L is longer and the length of the cooling part 1d can be more sufficiently secured, or the flow channel diameter D3 is smaller, and the flow rate of the pure water which flows in the pressure introduction flow channel is smaller.

Based on the experimental data shown in FIG. 5, and the graph shown in FIG. 6, the inventors determined that the flow channel length L and the flow channel diameter D3 of each of the first pressure introduction flow channel 14 and the second pressure introduction flow channel 15 which are formed in the cooling part 1d of this embodiment satisfy relation shown in the following Expression (1).

$$20 \leq L/D3 \leq 30 \qquad (1)$$

Herein, the reason why 20≤L/D3 is established in Expression (1) is that the pressure sensor maximum arrival temperature is set to 35° C. or less, as shown in FIG. 6. The reason of the above is that when the temperatures of the pressure sensors each become a temperature higher than a normal temperature (25° C.), measurement errors are generated in the detection values of the pressure sensors due to the influence of the temperatures.

Additionally, the reason why L/D3≤30 is established in Expression (1) is that the deterioration of the replaceability of fluid, which results from a too long flow channel length L and a too small flow channel diameter D3, is avoided.

The condition of L/D3≤30 is satisfied, so that the too small flow channel diameter D3 with respect to the flow channel length L, or the too long flow channel length L with respect to the flow channel diameter D3 is avoided, so that the replaceability of fluid can be secured.

The case where the replaceability of fluid is poor means a case where time required for changing over the kind of fluid that is present in each of the first pressure introduction flow channel 14 and the second pressure introduction flow channel 15 is long, in a case of changing over the kind of fluid which is flowing in the main flow channel 13 (e.g., case of changing over from pure water to liquid chemicals). The longer the flow channel length L is and the smaller the flow channel diameter D3 is, the lower the replaceability of fluid is.

The value of L/D3 is set in the range of the above Expression (1), so that it is possible to suppress the generation of measurement errors in the detection values of the pressure sensors due to temperature change in a case where the temperature of the fluid that flows into the differential pressure type flowmeter rapidly changes, and it is possible to secure the replaceability of the fluid. Additionally, it is more preferable to satisfy the condition of the following Expression (2).

$$L/D3 = 25 \qquad (2)$$

The condition of Expression (2) is a condition where (L, D3) is set to (25.0 mm, 1.0 mm), (50.0 mm, 2.0 mm), or (62.5 mm, 2.5 mm) in the experimental data shown in FIG. 5.

The reason why the above condition is established is that it is possible that the pressure sensor maximum arrival temperature does not exceed 35° C., even in a case where the temperature of fluid rapidly changes from a normal temperature (25° C. in the example of the experimental data), which is an environmental temperature in environment in which the differential pressure type flowmeter 20 is installed, to 80° C.

In the condition of Expression (2), as shown in the experimental data, (L, D3) is more preferably set to (50.0 mm, 2.0 mm). Thus, the flow channel length L is set to 50.0 mm, so that it is possible to suppress the generation of measurement errors in the detection values of the pressure sensors due to temperature change without enlarging the flow controller 10 and deteriorating the replaceability of fluid.

Now, the outer peripheral surface of the cooling part 1d of this embodiment will be described.

As shown in FIG. 1 to FIG. 3, the outer peripheral surface of the cooling part 1d, which forms the first pressure introduction flow channel 14 and the second pressure introduction flow channel 15, has a cooling structure in which a contact area with outside air is increased. More specifically, the cooling structure is a fin structure in which annular recessed parts 16 and annular protruding parts 17 are alternately arranged along the flow channel direction of the first pressure introduction flow channel 14 and the second pressure introduction flow channel 15.

Such a fin structure is employed, so that it is possible to enhance an effect of cooling fluid which flows in each of the first pressure introduction flow channel 14 and the second pressure introduction flow channel 15.

Operation and effects produced by the flow controller 10 of this embodiment described above will be described.

According to the differential pressure type flowmeter 20 of this embodiment, the flow channel length L and the flow channel diameter D3 of the first pressure introduction flow channel 14 which guides the fluid on the upstream side of the orifice 2 to the first pressure sensor 7 coincide with the flow channel length L and the flow channel diameter D3 of the second pressure introduction flow channel 15 which guides the fluid on the downstream side of the orifice 2 to the second pressure sensor, respectively. The ratio of the flow channel length L to the flow channel diameter D3 is 20 times or more, and therefore the flow channel length L to the flowing amount of the fluid in each flow channel is sufficiently secured. Therefore, for example, even in a case where the temperature of the fluid that flows into the differential pressure type flowmeter 20 rapidly changes from a temperature which coincides with the environmental temperature (e.g., case where the temperature is changed from an environmental temperature of 25° C. to 80° C.), the temperature of the fluid can be made to be a temperature (e.g., 35° C. or less) sufficiently close to the environmental temperature before the fluid reaches each pressure sensor from the main flow channel 13. Accordingly, it is possible to suppress the generation of measurement errors in the detection values of the first pressure sensor 7 and the second pressure sensor 8 due to temperature change, even in a case where the temperature of the fluid that flows into the differential pressure type flowmeter 20 rapidly changes.

Additionally, the ratio of the flow channel length L to the flow channel diameter D3 is 30 times or less, and therefore it is possible to suppress such a defect that the flow channel length L becomes too long, or the flow channel diameter D3 becomes too small, and excessive time is required for changing over the kind of the fluid flowing in the differential pressure type flowmeter 20 (e.g., changing over from pure water to liquid chemicals), and to secure the replaceability of the fluid.

Thus, according to the differential pressure type flowmeter 20 of this embodiment, it is possible to suppress the generation of measurement errors in the detection values of the pressure sensors due to temperature change, even in a case where the temperature of the fluid that flows into the differential pressure type flowmeter 20 rapidly changes. Additionally, it is possible to secure the replaceability of the fluid.

In the differential pressure type flowmeter 20 of this embodiment, the ratio of the flow channel length L to the flow channel diameter D3 is preferably 25 times. Additionally, it is more preferably that the flow channel length is 50 mm, and the flow channel diameter is 2 mm.

Thus, it is possible that the temperature of each pressure sensor does not exceed 35° C., for example, even in a case where the temperature of fluid rapidly changes from an environmental temperature (e.g., 25° C.) in environment in which the differential pressure type flowmeter 20 is installed, to 80° C.

In the differential pressure type flowmeter 20 of this embodiment, the main flow channel 13, the first pressure introduction flow channel 14, and the second pressure introduction flow channel 15 are formed inside the cooling part 1$d$ of the body 1 formed by a resin material.

Thus, it is possible to provide the differential pressure type flowmeter 20 that includes the body 1 integrally formed by the main flow channel 13, the first pressure introduction flow channel 14, the second pressure introduction flow channel 15, and the resin material.

The first pressure introduction flow channel 14, and the second pressure introduction flow channel 15 are formed integrally as the body 1, and therefore the ambient temperature of the first pressure sensor 7 and the ambient temperature of the second pressure sensor 8 are substantially uniform. Therefore, the temperature states of the first pressure sensor 7 and the second pressure sensor 8 are made uniform, and the measurement of a stable flow rate is possible. While the body 1 of this embodiment is provided with a through hole between the first pressure introduction flow channel 14 and the second pressure introduction flow channel that are formed in the cooling part 1$d$, the vicinities of the sensor body 7$a$ and the sensor body 8$a$ at the upper part of the through hole are connected by the body 1. Therefore, temperature transfer is performed so as to eliminate a temperature difference between the sensor body 7$a$ and the sensor body 8$a$ by a part connected by the body 1.

In the differential pressure type flowmeter 20 of this embodiment, the cooling structure in which the contact area with outside air is increased is formed on the outer peripheral surface of the cooling part 1$d$ that forms the first pressure introduction flow channel 14 and the second pressure introduction flow channel 15. This cooling structure is the fin structure in which the annular recessed parts 16 and the annular protruding parts 17 are alternately arranged along the flow channel direction of the first pressure introduction flow channel 14 and the second pressure introduction flow channel 15.

Thus, the fluid flowing in each of the first pressure introduction flow channel 14 and the second pressure introduction flow channel 15 can be sufficiently cooled by the cooling structure before reaching each pressure sensor, when the fluid is guided from the main flow channel 13 to each pressure sensor through each of the first pressure introduction flow channel 14 and the second pressure introduction flow channel 15 communicating with the main flow channel 13.

Second Embodiment

Hereinafter, a flow controller 10' of a second embodiment of the present disclosure will be described with reference to the drawings.

This embodiment is a modification of the first embodiment, and is similar to the first embodiment except a case particularly described below, and therefore description will be omitted.

Figure 7:
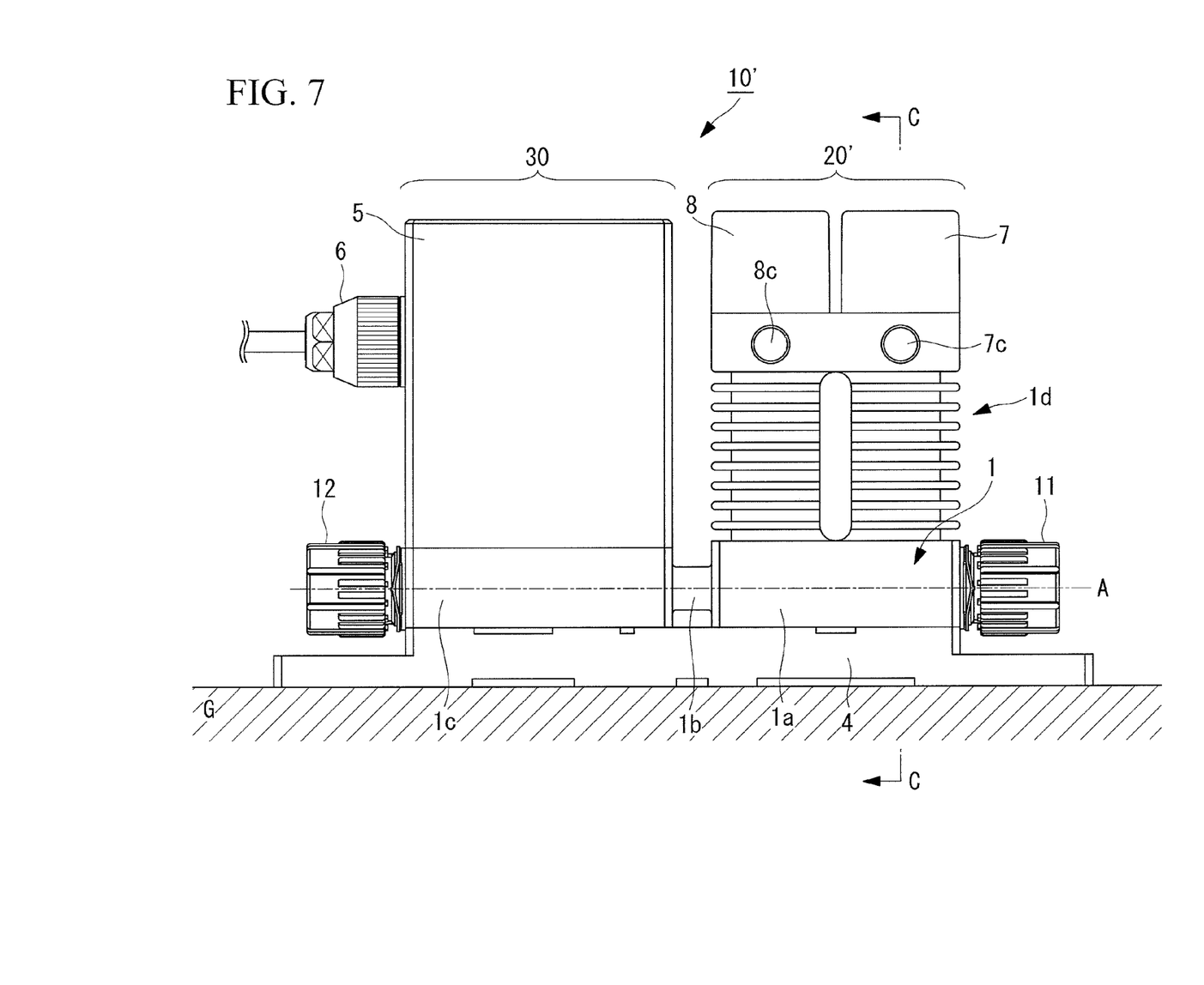
FIG. 7 is a front view of a flow controller according to a second embodiment of the present disclosure.

As shown in FIG. 7, a differential pressure type flowmeter 20' provided in the flow controller 10' of the second embodiment includes a first discharge port 7$c$ (first outlet) that discharges fluid guided to a first pressure sensor 7 to the outside, and a second discharge port 8$c$ (second outlet) that discharges fluid guided to a second pressure sensor 8 to the outside.

Figure 8:
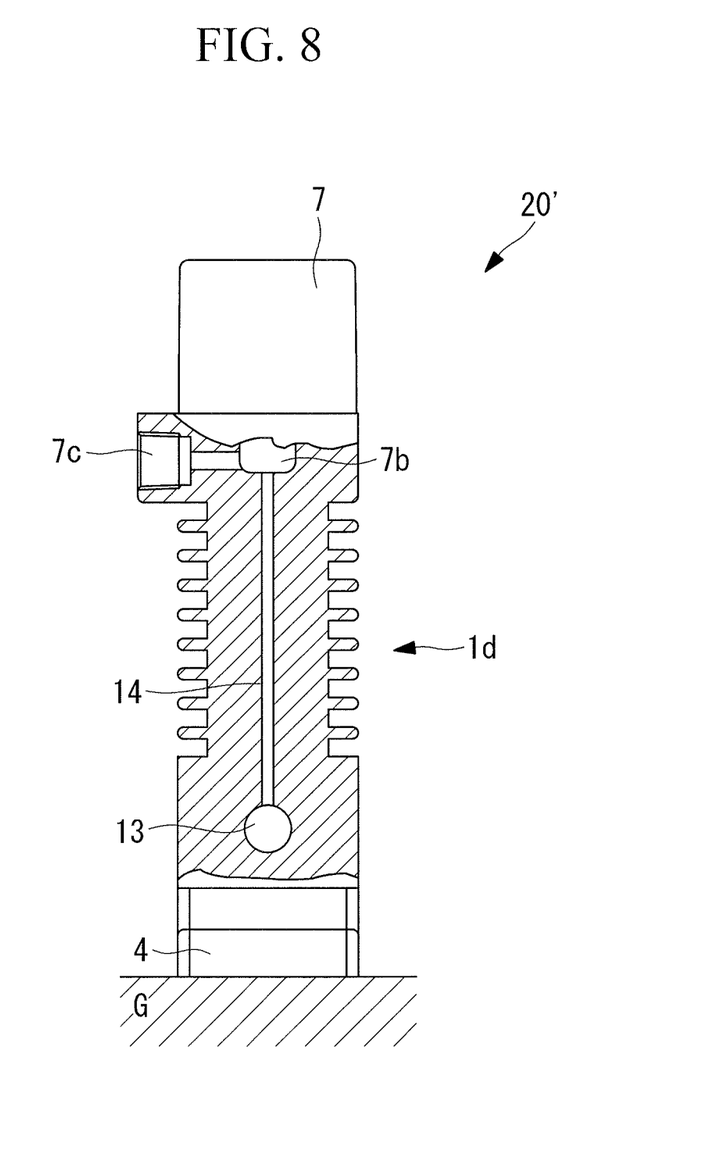
FIG. 8 is a partial sectional view taken along the C-C arrow of the flow controller shown in FIG. 7.

As shown in FIG. 8, the first discharge port 7$c$ communicates with a first fluid chamber 7$b$. Into this first discharge port 7$c$, a sealing piece (not shown) is inserted during normal use, so that fluid in the first fluid chamber 7$b$ is not discharged from the first discharge port 7$c$ to the outside.

Although illustration is omitted, the second discharge port 8$c$ communicates with a second fluid chamber 8$b$. Into second discharge port 8$c$, a sealing piece (not shown) is inserted during normal use, so that fluid in the second fluid chamber 8$b$ is not discharged from the second discharge port 8$c$ to the outside.

In the first discharge port 7c and the second discharge port 8c, the sealing pieces are removed, and a pipe (not shown) which discharges fluid is connected to each port, when the kind of fluid flowing in a main flow channel 13 of the flow controller 10' is changed over (e.g., changed over from pure water to liquid chemicals).

When the pipe is connected to each port, the fluid in the first fluid chamber 7b is discharged from the first discharge port 7c to the outside through the pipe. Similarly, the fluid in the second fluid chamber 8b is discharged from the second discharge port 8c to the outside through the pipe.

Thus, according to this embodiment, it is possible to easily replace fluid without returning the fluid guided to the first pressure sensor 7 through a first pressure introduction flow channel 14, to the main flow channel 13 through the first pressure introduction flow channel 14 again. Similarly, it is possible to easily replace fluid without returning the fluid guided to the second pressure sensor 8 through a second pressure introduction flow channel 15, to the main flow channel 13 through the second pressure introduction flow channel 15 again.

Other Embodiments

The present disclosure is not limited to the above embodiments, and changes and modifications may be made optionally without departing from the scope of the present disclosure.

The invention claimed is:

1. A differential pressure type flowmeter comprising:
a main flow channel configured to allow fluid to flow;
an orifice provided in the main flow channel;
an upstream pressure sensor configured to detect pressure of fluid on an upstream side of the orifice;
a downstream pressure sensor configured to detect pressure of fluid on a downstream side of the orifice;
a first flow channel communicating with the main flow channel, and configured to guide the fluid on the upstream side of the orifice to the upstream pressure sensor; and
a second flow channel communicating with the main flow channel, and configured to guide the fluid on the downstream side of the orifice to the downstream pressure sensor, wherein
the upstream pressure sensor includes a first sensor body that detects pressure of fluid which flows from the main flow channel into a first fluid chamber through the first flow channel,
the downstream pressure sensor includes a second sensor body that detects pressure of fluid which flows from the main flow channel into a second fluid chamber through the second flow channel,
a first flow channel length of the first flow channel coincides with a second flow channel length of the second flow channel, the first flow channel length being a length from the main flow channel to an inlet of the first fluid chamber, the second flow channel length being a length from the main flow channel to an inlet of the second fluid chamber,
a first flow channel diameter of the first flow channel coincides with a second flow channel diameter of the second flow channel, and
a ratio of the first flow channel length to the first flow channel diameter and a ratio of the second flow channel length to the second flow channel diameter are not less than 20 times and not more than 30 times, respectively.

2. The differential pressure type flowmeter according to claim 1, wherein
the ratio of the first flow channel length to the first flow channel diameter and the ratio of the first flow channel length to the first flow channel diameter are 25 times, respectively.

3. The differential pressure type flowmeter according to claim 2, wherein
the flow channel length is 50 mm, and the flow channel diameter is 2 mm.

4. The differential pressure type flowmeter according to claim 1, wherein
the main flow channel, the first flow channel, and the second flow channel are formed inside a body part formed by a resin material.

5. The differential pressure type flowmeter according to claim 4, wherein
a cooling structure in which a contact area with outside air is increased is formed on an outer peripheral surface of the body part that forms the first flow channel and the second flow channel.

6. The differential pressure type flowmeter according to claim 5, wherein
the cooling structure is a fin structure in which annular recessed parts and annular protruding parts are alternately arranged along a flow channel direction of the first flow channel and the second flow channel.

7. The differential pressure type flowmeter according to claim 1, comprising:
a first outset configured to discharge the fluid guided to the upstream pressure sensor through the first flow channel, to outside; and
a second outlet configured to discharge the fluid guided to the downstream pressure sensor through the second flow channel, to the outside.

8. A flow controller comprising:
the differential pressure type flowmeter according to claim 1; and
a control unit configured to control a flow rate of fluid that flows out of a flow channel outlet, by using a measured value of the differential pressure type flowmeter.

* * * * *